(12) United States Patent
Muyzert et al.

(10) Patent No.: US 8,358,560 B2
(45) Date of Patent: Jan. 22, 2013

(54) MARINE SEISMIC ACQUISITION SYSTEM

(75) Inventors: Everhard Johan Muyzert, Girton (GB); James Edward Martin, Cottenham (GB); Robert Montgomery Laws, Cambridge (GB); Philip Andrew Felton Christie, Fen Drayton (GB)

(73) Assignee: WesternGeco L.L.C., Houston, TX (US)

( * ) Notice: Subject to any disclaimer, the term of this patent is extended or adjusted under 35 U.S.C. 154(b) by 983 days.

(21) Appl. No.: 10/586,576

(22) PCT Filed: Jan. 28, 2005

(86) PCT No.: PCT/GB2005/000314
§ 371 (c)(1),
(2), (4) Date: Aug. 11, 2008

(87) PCT Pub. No.: WO2005/073758
PCT Pub. Date: Aug. 11, 2005

(65) Prior Publication Data
US 2008/0291779 A1 Nov. 27, 2008

(30) Foreign Application Priority Data
Jan. 30, 2004 (GB) .................. 0402012.9

(51) Int. Cl.
*G01V 1/38* (2006.01)
(52) U.S. Cl. ........................................ 367/20
(58) Field of Classification Search .......... 367/15, 367/16, 20, 21, 124–130
See application file for complete search history.

(56) References Cited

U.S. PATENT DOCUMENTS

| | | | |
|---|---|---|---|
| 3,803,543 A | 4/1974 | Cioccio et al. | |
| 3,952,281 A | 4/1976 | Parrack | |
| 4,547,869 A | 10/1985 | Savit | |
| 4,692,907 A * | 9/1987 | Jubinski | 367/20 |
| 4,712,082 A * | 12/1987 | Ito et al. | 338/4 |
| 4,912,682 A * | 3/1990 | Norton et al. | 367/19 |
| 4,958,328 A | 9/1990 | Stubblefield | |
| 4,995,013 A | 2/1991 | Dumaine et al. | |
| 5,265,066 A | 11/1993 | Svenning et al. | |
| 5,321,333 A * | 6/1994 | Walden et al. | 310/333 |
| 6,430,105 B1 * | 8/2002 | Stephen | 367/15 |
| 6,512,980 B1 | 1/2003 | Barr | |
| 6,684,160 B1 * | 1/2004 | Ozbek et al. | 702/17 |
| 6,714,138 B1 * | 3/2004 | Turner et al. | 340/854.3 |
| 6,791,901 B1 * | 9/2004 | Robertsson et al. | 367/58 |
| 6,853,604 B2 * | 2/2005 | Spackman et al. | 367/154 |
| 7,206,254 B2 * | 4/2007 | Oliver et al. | 367/20 |

(Continued)

FOREIGN PATENT DOCUMENTS
EP 0175026 A1 3/1986
(Continued)

OTHER PUBLICATIONS

Christie et al 'Raising the standards of seismic data quality' Schlumberger Oilfield Review, Summer 2001, p. 16-31.

(Continued)

*Primary Examiner* — Isam Alsomiri
*Assistant Examiner* — Krystine Breier

(57) ABSTRACT

A marine cable for seismic surveys is described with a plurality of ceramic pressure sensors (901-904) arranged in groups of at least two pressure sensors with a group output being representative of the vertical pressure gradient at the group location, and an inclinometric system including one or more transducers for determining the orientation of the sensors of the group in order to determine their true vertical separation.

14 Claims, 6 Drawing Sheets

U.S. PATENT DOCUMENTS

2004/0211569 A1* 10/2004 Vinegar et al. ............... 166/380
2005/0078554 A1*  4/2005 Bittleston .................... 367/19

FOREIGN PATENT DOCUMENTS

| GB | 2318185 A1 | 4/1998 |
| GB | 2363459 A | 12/2001 |
| GB | 2389183 A | 12/2003 |
| WO | 97/37246 A1 | 10/1997 |
| WO | 02/01254 A1 | 1/2002 |
| WO | 02/073239 A1 | 9/2002 |
| WO | 03/019224 A1 | 3/2003 |
| WO | 03/058281 A1 | 7/2003 |

OTHER PUBLICATIONS

Robertsson et al. 'Rough-sea deghosting using a single streamer and a pressure gradient approximation' Geophysics, 67, 2002, p. 2005-2011.

Court, "Streamer compass validation and verification", Geophysics, vol. 58, No. 4, 1993, pp. 589-592.

* cited by examiner

FIG. 2 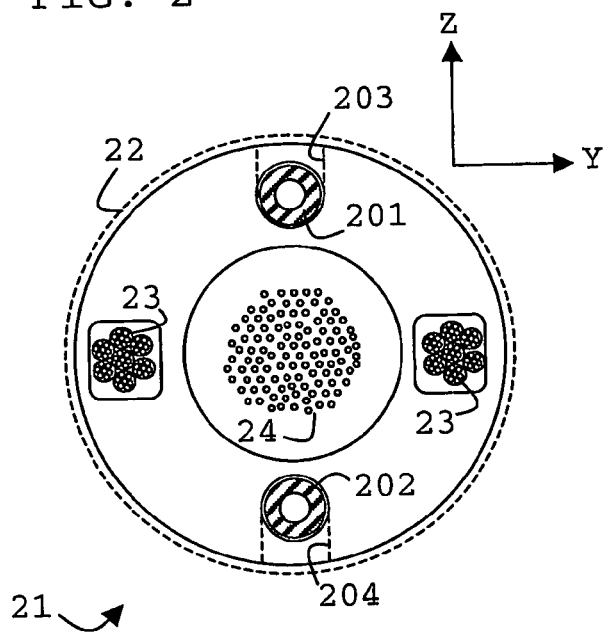 FIG. 3 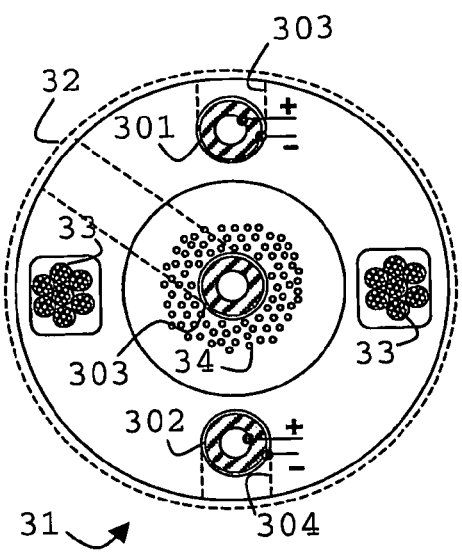
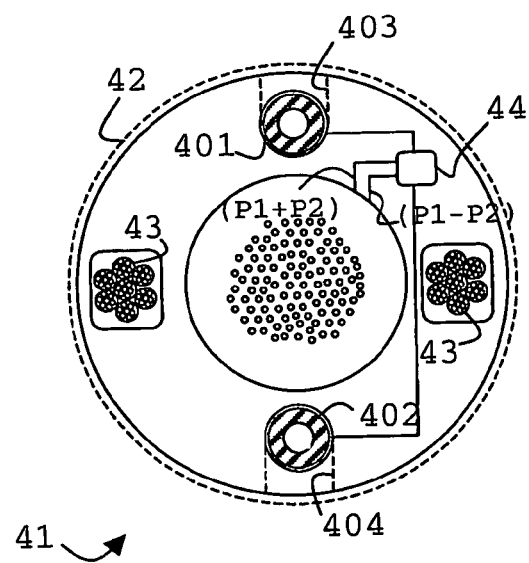
FIG. 4

MARINE SEISMIC ACQUISITION SYSTEM

CROSS-REFERENCE TO RELATED APPLICATIONS

This application claims the benefits of priority from:
i) Application Number 0402012.9, entitled "MARINE SEISMIC ACQUISITION SYSTEM," filed in the United Kingdom on 30 Jan. 2004; and
ii) Application Number PCT/GB2005/000314, entitled "MARINE SEISMIC ACQUISITION SYSTEM," filed under the PCT on 28 Jan. 2005;

All of which are commonly assigned to assignee of the present invention and hereby incorporated by reference in their entirety.

This invention relates to methods and apparatus for acquiring seismic data using sub-arrays of seismic sensors in a cable-type or streamer-like seismic acquisition system.

BACKGROUND OF THE INVENTION

In seismic exploration at sea, a plurality of seismic sensors are encased in a long tubular plastic cables which may extend for several miles. Depending on the respective type of seismic survey these cables are known as ocean bottom cable (OBC) or as streamers.

A streamer is towed by a seismic acquisition vessel through the water at a desired depth. A marine seismic source, such as an airgun, is used to generate acoustic waves. The acoustic waves are reflected from the earth layers below, to return to the surface of the water in the form of pressure waves. The pressure waves are detected by the pressure sensors and are converted to electrical signals.

A towed streamer comprises a plurality of pressure sensitive hydrophone elements enclosed within a waterproof jacket and electrically coupled to recording equipment onboard the vessel. Each hydrophone element within the streamer is designed to convert the mechanical energy present in pressure variations surrounding the hydrophone element into electrical signals. This streamer may be divided into a number of separate sections or modules that can be decoupled from one another and that are individually waterproof. Individual streamers can be towed in parallel through the use of paravanes to create a two-dimensional array of hydrophone elements. Data buses running through each of the modules in the streamer carry the signal from the hydrophone elements to the recording equipment (so-called acoustic data).

A hydrophone may produce electrical signals in response to variations of acoustic wave pressure across the hydrophone. Several hydrophones may be electrically coupled together to form an active section or group of an acoustic sensor array or streamer. Electrical signals from multiple hydrophones of an active section are typically combined to provide an average signal response and/or to increase the signal-to-noise ratio.

Recently, a new generation of streamers was introduced using so-called point receivers. In these streamers, signals can be recorded by individual hydrophones. Details of the new streamer design with the comparison to conventional streamers are described in the Summer 2001 edition of the Oilfield Review pages 16-31. For the purpose of the present invention it is important to note that in both, point receiver streamers and conventional streamer, hydrophones are arranged in essentially linear arrays in direction of the streamer.

The reflected sound waves not only return directly to the pressure sensors where they are first detected, but those same reflected sound waves are reflected a second time from the water surface and back to the pressure sensors. The surface-reflected sound waves of course, are delayed by an amount of time proportional to twice the depth of the pressure sensors and appear as secondary or "ghost" signals. Because the direct and surface-reflected sound waves arrive close together in time, they tend to interfere with one another or with other signals that propagate through the earth and share the same arrival time. It is therefore desirable to determine the direction of propagation of the sound waves so that the upward- and downward-propagating waves may be more readily separated during data processing.

In so-called dual sensor towed streamers, the streamer carries a combination of pressure sensors and velocity sensors. The pressure sensor is typically a hydrophone, and the motion or velocity sensors are geophones or accelerometers. In the U.S. Pat. No. 6,512,980 a streamer is described carrying pairs of pressure sensors and motion sensors combined with a third sensor, a noise reference sensor. The noise reference sensor is described as a variant of the prior art pressure sensor.

In practice, dual sensor towed streamers are difficult to use as the geophones deployed in the streamer generate signals proportional to vibrations of the streamer. Also, it is often not easy to correlate the respective outputs of hydrophones and geophones.

It is further known to position two individual hydrophones in a vertical array. It would of course then be relatively easy to identify the direction of propagation of the sonic waves from the measured difference in time that a particular wavelet arrives at the respective sensors that make up the vertical array, as described de for example in U.S. Pat. No. 3,952,281. That method however requires two separate hydrophone cables. Since such cables cost about a half-million dollars each, this approach is hampered by the relative complexity of deployment and the high costs involved in duplicating the number of streamers in a survey.

In U.S. Pat. Nos. 4,547,869 and 4,692,907, it has been suggested to mount a substantially vertical array of sensors inside the same streamer, a few inches apart. But a seismic streamer cable twists and turns as it is towed through the water. This twisting and turning of a streamer makes it difficult to distinguish between the sensors in the vertical array. The '907 patent suggests the use of sensors with differential buoyancy inside liquid-filled chambers.

The '869 patent describes an acquisition system based on monomodal optical fibers using the difference in phase shifts due to the hydrostatic pressure of the optical signal of diametrically opposed pairs of fiber sensors as a means to identify the orientation of the fiber sensors. A similar streamer is described in EP 0175026 A1.

Outside the field of seismics, arrays of groups of hydrophones have been suggested for linear antennas (WO-03/019224 A1) and In the light of the above, it is an object of this invention to provide an improved seismic acquisition system including arrays of hydrophones in a cable or a plurality of cables towed by a seismic vessel.

SUMMARY OF THE INVENTION

According to a first aspect of the present invention, there is provided a marine seismic survey system with a marine cable with a plurality of piezo-ceramic pressure sensors, wherein said plurality of pressure sensors is arranged in groups of at least two pressure sensors with a group output being representative of the vertical pressure gradient at the group location, said system further comprising one or more electromechanical transducers for determining the relative position of said at least two pressure sensors in order to determine their vertical separation.

The cable of the present invention can be an ocean bottom cable or a vertical seismic cable, such as used for vertical seismic profiling (VSP). Most preferably however, the cable is one of a plurality of streamers towed behind a seismic survey vessel though a body of water.

A group is defined by (a) proximity and (b) by the processing of the outputs of the hydrophones. The hydrophones of a group are essentially closest neighbors. In a streamer the hydrophones within a group are typically separated 1 to 10 cm, whereas the inter-group distance is 0.5 or 1 meter to 7.5 meters. In a preferred embodiment, the at least two pressures sensors contributing to the group output being representative of the vertical pressure gradient are located within a section the cable of less than 6 cm or even 3 cm length, thus allowing to be mounted onto one single hydrophone holder in a streamer. The vertical separation between the hydrophones within a group is preferably less than 6 cm.

In a preferred variant, the hydrophones of a group are equidistantly spaced.

Preferably most or all of the hydrophones are arranged in a plane perpendicular to the main axis of the cable. However, for a full waveform recording involving the acquisition of vertical, inline and crossline seismic signals, it is important to have at least one pressure sensor located off-plane. Or, alternatively, a sensor of a neighboring group provides the additional off-plane pressure measurement. In a variant of the invention, a group could consist of four hydrophones in a tetrahedral arrangement.

It is advantageous to combine or hardwire the output signals of the hydrophones and/or amplify them prior to a digitization process as the pressure difference between two narrowly separated hydrophones can be extremely small.

It is a further aspect of the invention to provide an inclinometric system to determine the orientation of the hydrophones in a group, in particular the vertical distance between those hydrophones used to determine the vertical pressure gradient. The measurement of the orientation or the angle of rotation is necessary as the cable, when suspended in or towed through a body of water, is subject to twisting and turning. In a preferred variant the inclinometric system comprises one or more electromechanical or electroacoustic devices that are not hydrophones. The devices are operated such as to cause a response indicative of the orientation or the angle of rotation of the hydrophones.

In a first embodiment, the electromechanical or electroacoustic devices of the inclinometric system is formed by one or more acoustic sources to emit acoustic signals or pulses and a system to measure the arrival time of the signals or pulses at the hydrophones. Preferably, use is made of existing sonic positioning systems as acoustic sources. However, it is possible to use characteristic and easily identifiable events generated by the seismic sources for such a measurement. The source or sources are preferably located in a streamer towed in parallel with the streamer carrying the hydrophone groups to produce a cross-line angle of incident of the sonic signals.

Alternatively, the electromechanical or electroacoustic devices may take the form of a plurality of small inclinometers It was found that accurate measurement could be performed using small and robust, preferably solid-state, inclinometers known as such. By distributing a sufficient number of such known sensors along the cable, its orientation with respect to the vertical or horizontal direction can be measured.

In both variants the measurement is independent of the hydrostatic pressure, i.e., the height of the water column above the sensors.

These and further aspects of the invention are described in detail in the following examples and accompanying drawings.

BRIEF DESCRIPTION OF THE DRAWINGS

The invention will now be described, by way of example only, with reference to the accompanying drawings, of which:

FIG. 2 is a vertical cross-section of a streamer cable with two hydrophones;

FIG. 3 shows a vertical cross-section of a streamer cable with three hydrophones;

FIG. 4 shows a vertical cross-section of a streamer cable with two hydrophones and a unit that generates the sum and the difference of the outputs of the two hydrophones as output signals;

DETAILED DESCRIPTION

Figure 1:
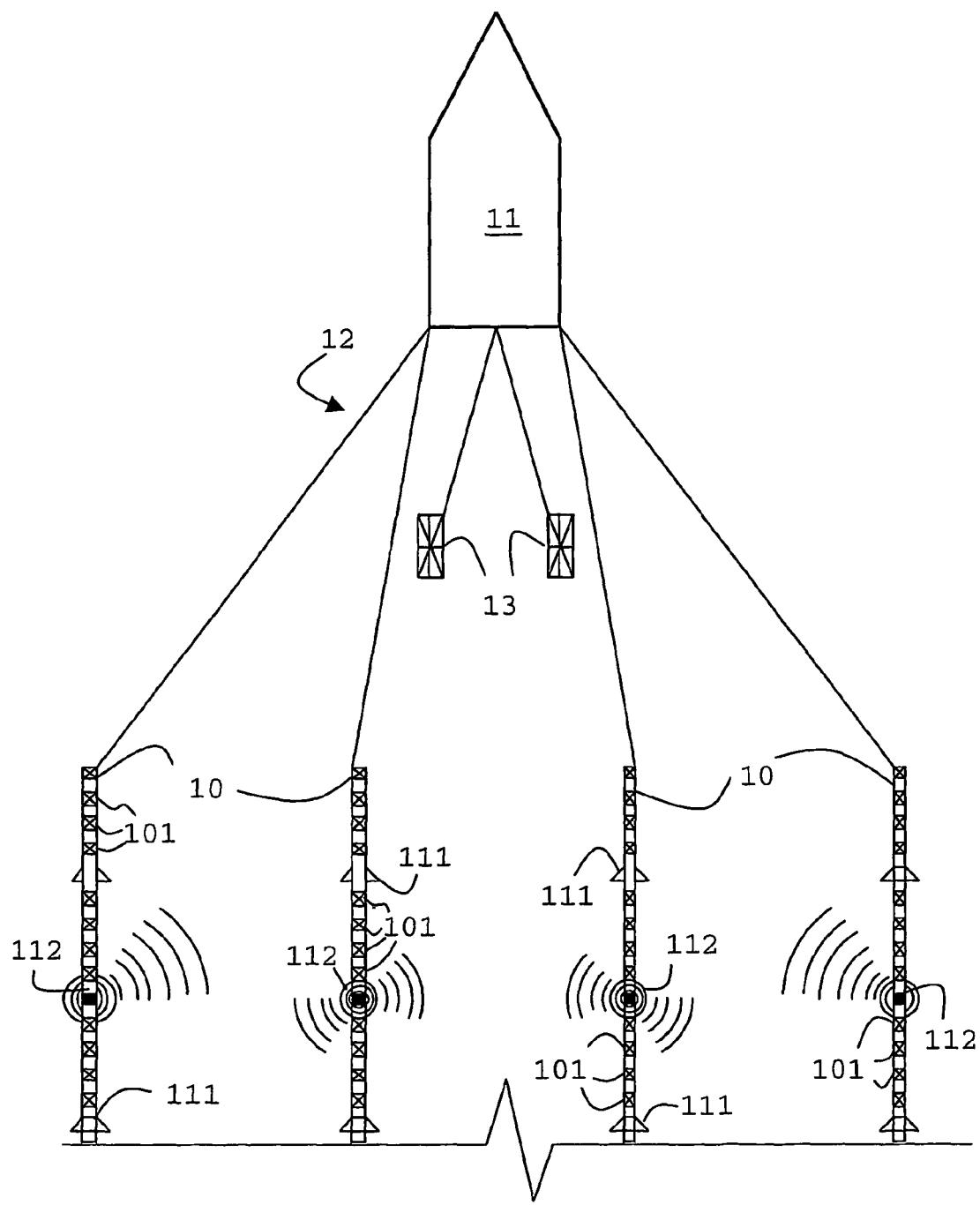
FIG. 1 shows a schematic illustration of a vessel towing streamers and seismic sources.

A typical marine seismic acquisition is illustrated in FIG. 1. Four instrumented cables or streamers 10 are towed by a ship 11. A front network 12 and similar tail network (not shown) is used to connect the vessel and the streamers. Embedded in the front network are seismic sources 13, typically an array of airguns. Each streamer 10 is typically assembled from many hydrophone holder segments that are coupled to make up the streamer. Between segments, the streamers carry controllable deflectors 111 (often referred to as vanes or "birds") and other aids for steering the streamer along a desired trajectory in a body of water.

The accurate positioning of modern streamers is controlled by a satellite based positioning system, such as GPS or differential GPS, with GPS receivers at the front and tail of the streamer. In addition to GPS based positioning, it is known to monitor the relative positions of streamers and sections of streamers through a network of sonic transceivers 112 that transmit and receive acoustic or sonar signals. Such systems are available from vendors such as Sonardyne.

The main purpose of a streamer 10 is to carry a large number of seismic sensors 101 which are distributed along its length. In FIG. 1 hydrophones are schematically depicted as marked boxes. The hydrophones of the present invention are of the known piezo-ceramic tube type. As the geometrical arrangement of the hydrophones is an aspect of the present invention, the details of several possible arrangements of hydrophones inside a streamer hull are described in the following figures.

A cross-section of hydrophone holder 21 inside a streamer cable 20 is shown in FIG. 2. Two hydrophones 201, 202 are arranged diametrically opposed to each other inside the openings 203, 204 of the holder 21. A flexible outer sheath 22 protects the hydrophones from a direct contact with the water. Each hydrophone consists of a hollow tube of piezo-ceramic material. Pressure leads to a deformation of the tube which in turn generates an electrical signal that, suitably amplified and calibrated, serves as a measure of the pressure.

Depending on the type of streamer, one or more stress members 23 of braided wire run through the streamer along the length of streamer segments or along its entire length. A data transmission backbone cable comprising of a plurality of electrical conductors and/or optical fibers 24 communicates data along the length of the streamer as well as to and from the towing vessel. The hydrophone holder 21 shown is one of a large number of holders distributed along the streamer. A streamer typically includes further chambers (not shown) between the holders to be filled with either liquid (such as kerosene) and/or solid flotation material (such as foam). It is thus possible to tune the buoyancy of the streamer in water.

Typically the hydrophones used in marine seismic streamers are cylindrical devices with their main axis (X) parallel with the main axis of the streamer so that the streamer accelerations in the crossline (Y) and vertical (Z) direction are cancelled. The Y axis and the vertical Z axis are both shown in FIG. 2 with the X axis (not shown), (the axis of the streamer) pointing out of the paper plane.

It is known that the vertical pressure gradient at a location x along the streamer can be measured using two hydrophones with a known vertical distance between them. The vertical pressure gradient dP/dz can be calculated from two vertically separated hydrophone recordings by subtraction of the two measurements.

$$dP(x)/dz = (P_1(x) - P_2(x))/dz \quad [1]$$

where P1(x) and P2(x) indicate the pressure as measured by the top hydrophone 201 and the bottom hydrophone 202, respectively.

The total pressure can be found from the output of one of the hydrophones or the average of the two hydrophone measurements.

In the vertical hydrophone arrangement of FIG. 2, the vertical pressure gradient measurement is not sensitive to inline accelerations or inline pressure gradients as the two pressure sensors have the same inline (X) coordinate. Therefore the pressure gradient data is less contaminated with swell noise.

In FIG. 3, a variant of the above hydrophone group is shown. In the example the holder 31 includes an additional centrally located hydrophone 303 that is added to the group of two vertical separated hydrophones 301 and 302 as described before. To the extent that other elements of FIG. 3 have already described in FIG. 2 an equivalent numerals has been used and further description of those elements has been omitted. In the variant of FIG. 3, it is seen as an advantage that a measurement of the pressure gradient can be effectively achieved through hard-wiring connecting electrically the (+) pole of one hydrophone with the (−) pole of the other and visa versa. The potential difference between the two connections yields the pressure difference dP. The additional third hydrophone 303 is used for the mean pressure measurement P.

Because the difference between the two hydrophones signals is very small this subtraction, carried out local to the sensors before digitization, is potentially more accurate than the arrangement of FIG. 2.

In the example of FIG. 4, two hydrophones 401, 402 are used to determine the pressure difference P1−P2 and the pressure sum P1+P2 using an appropriate electric circuit or network 44 of conductors. The two hydrophones 401, 402 are connected such that one output of the circuit 44 is proportional to the difference between the hydrophones and thus the pressure gradient, whilst the other is proportional to the sum and the mean pressure between the two hydrophones, i.e. to $P_1 - P_2$ and $P_1 + P_2$, respectively. To the extent that other elements of FIG. 4 have already described in FIG. 2 an equivalent numerals has been used and further description of those elements has been omitted.

It is worth noting that a great dynamic range of the recording system is necessary in order to achieve the required accuracy of measurement of the pressure gradient.

Figure 5:
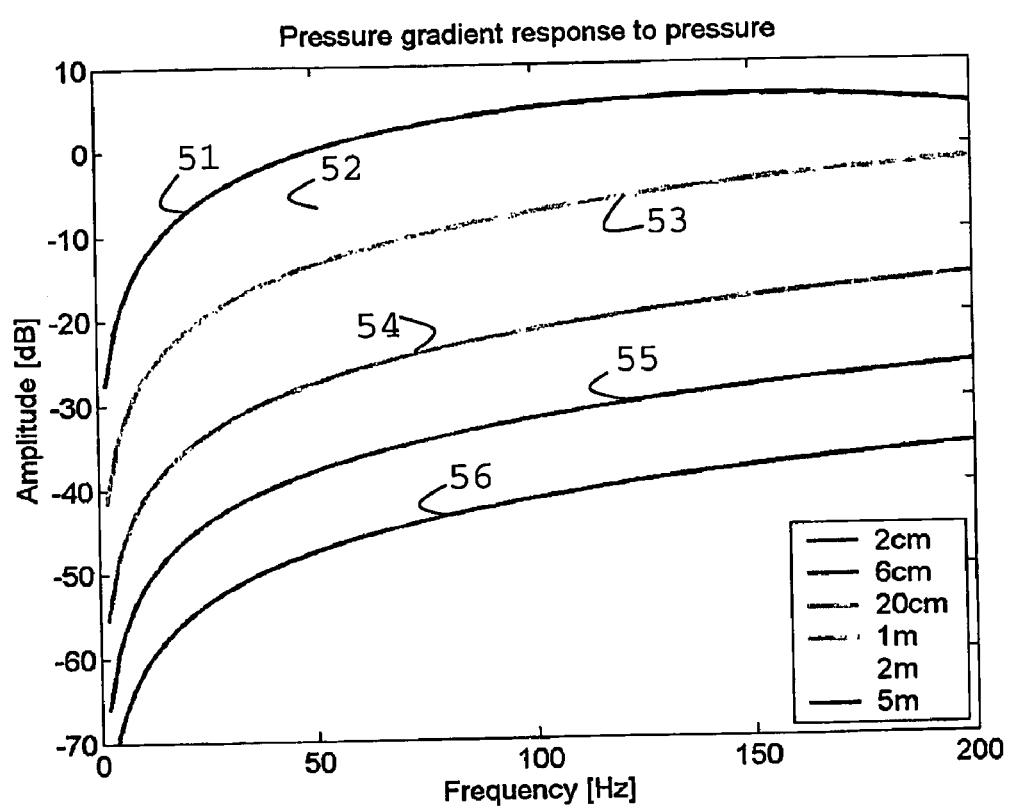
FIG. 5 is a plot of the relative amplitude of a pressure gradient measurement as function of the signal frequency.

The theoretical amplitude response of two hydrophones at a given vertical separation to a vertically propagating pressure wave as function of frequency and sensor separation can be expressed as:

$$F(\omega) = |\exp(-ikz) - \exp(ikz)| \quad [2]$$
$$= |1 + i2\sin(\omega z/c)|$$

where z is half the vertical sensor separation. This response F(w) has been modeled for 6 different sensor separations: 2 cm (51), 6 cm(52), 20 cm(53), 1 m(54), 2 m(55) and 5 m(56) and plotted in FIG. 5. For example, in case of a 6 cm separation between the hydrophones, which reflects a upper limit for the vertical separation between the hydrophones of a group within a streamer cable, curve 52 predicts a the pressure gradient signal with respect to the pressure at that frequency of −57 dB at 5 Hz, −38 dB at 50 Hz and −32 dB at 100 Hz.

The amplitude of the pressure gradient signal decreases with decreasing frequency, at 5 Hz it is 0.001412 times weaker than the pressure signal (−57 dB). With regard to a digitized output, this means that the first 10 significant bits of a pressure recording are not used (i.e. are zeros). When subtracting the hydrophones before recording, this bit-loss does not occur, although an additional preamplifier might be required to boost the weaker gradient signal.

With a measurement and knowledge of the pressure gradient dP/dz various known methods can be applied to attenuate or remove ghosts from seismic data. Such methods are for example described, in the published International patent application WO 02/01254, and the United Kingdom patent GB 2363459.

It is for example known to use the vertical pressure gradient given by:

$$P^u(x) = 0.5\left[P(x) + \frac{1}{ik_z} * \frac{dP(x)}{dz}\right] \quad [3]$$

where $p^u(x)$ is the upgoing deghosted wavefield at position x along the streamer, p(x) is the raw pressure recording and $k_z$ the vertical wavenumber. This equation can be solved in the frequency-wavenumber or FK-domain using streamer data and the relation between the horizontal inline and vertical wavenumber, ignoring the crossline wavenumber:

$$k^2 = \omega^2/c^2 = k_x^2 + k_z^2 \quad [4]$$

One of the major problems to overcome when implementing the present invention is caused by the rotation of the streamer around its longitudinal (X)axis. It is known that the streamer cable can twist and turn thereby removing the vertically arranged hydrophones from their desired positions. This rotation of the streamer around its main axis introduces an error in the vertical pressure gradient measurement as the vertical separation of the hydrophones changes.

In practice the streamer rotation may occur during deployment or in operation. Streamer rotation angles of up to 360° have been observed. At an angle of 90° a hydrophone pair, such as described above in FIGS. 2-4, has no vertical separation and no vertical pressure gradient can be measured.

Figure 6:
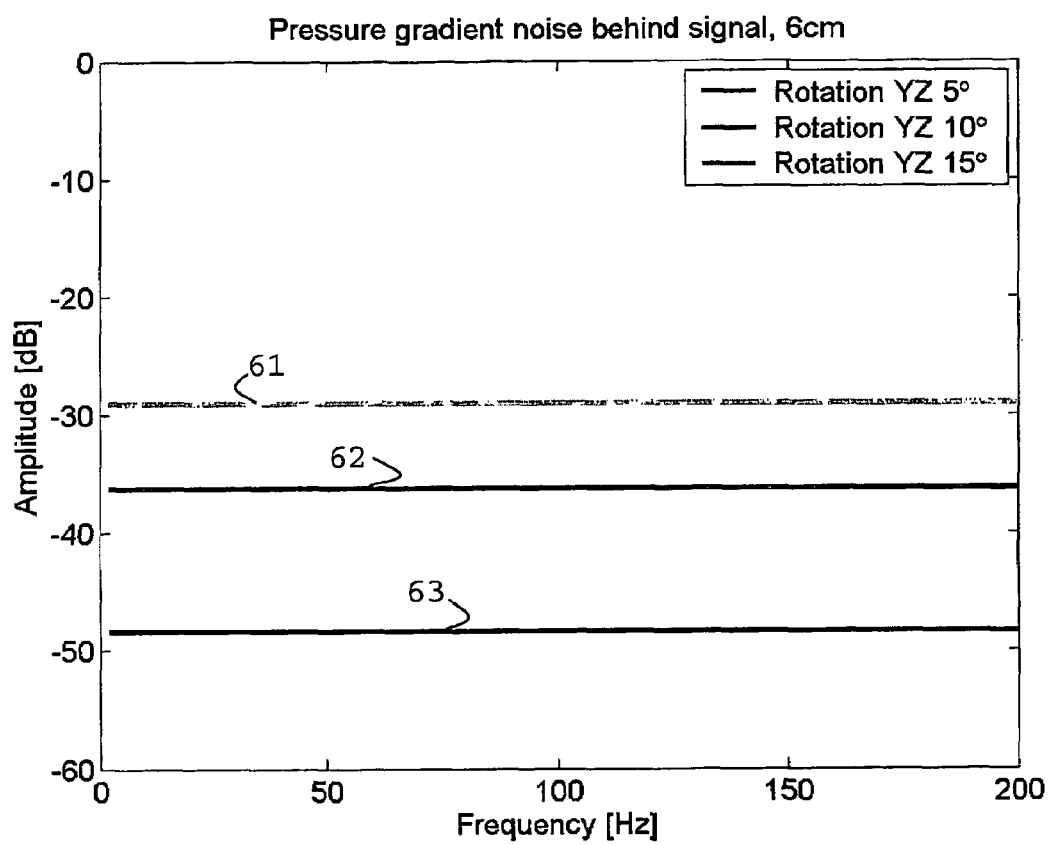
FIG. 6 illustrates the relative amplitude of a pressure gradient measurement as function of the signal frequency for the different rotation angles of a streamer cable.

But even at smaller angles than 90 degrees an error is introduced in the measurement of the pressure gradient. The error due to small rotation angles (YZ rotation) is shown in FIG. 6 with plots that illustrate the attenuation of the gradient signal at 6 cm vertical separation for a rotation angle of 5° (61), 10°(62) and 15° (63). At 10° rotation angle for example, the curve 62 gives a −36.2 dB error that is almost constant with frequency.

In order to reduce the error generated by the streamer rotation the present invention includes means to determine the angle of rotation of one or more groups of hydrophones inside the deployed streamer.

In a first embodiment, the rotation angle of the cable can be measured using one or more inclinometers (or gyroscopes) that measure the crossline angle with the horizontal. Such inclinometric devices have been used in recent Ocean Bottom cables (OBCs).

Another more preferred embodiment makes novel use of the existing acoustic positioning systems 112 as described above with reference to FIG. 1. Such an acoustic positioning system consists of high frequency (1500-4500 Hz) sonic transceivers placed inside each streamer. Usually the signals emitted from those sources are picked up by other transceivers in the streamer array thus providing relative positioning information. In the present invention the hydrophones are used to receive signals of the sonic transceivers.

For acoustic sources located in nearby streamers at the same elevation as a hydrophone group the arrival time of the direct acoustic signal for the two vertical hydrophones is identical. This changes as the hydrophones of the group rotate around the streamer axis. One of the hydrophones is moved closer to the sonic source while the other moves away from it. An accurate measurement of the respective arrival times when combined with the known relative positions of the hydrophones then yields the angle of rotation.

Such measurement extends to other geometrical arrangement within a group of hydrophones, as long as the hydrophone maintain fixed distance between each other.

As an alternative to use of the direct signal, seafloor reflections of the sonic transceiver signal or even easily detectable signals generated by the seismic sources 110 can be used to determine traveltime differences between the hydrophones of a group and, thus, their angle of rotation.

Using for example the seismic source and receiver positions and the water depth the expected arrival angle seabottom reflection can be calculated and compared with the pressure gradient estimate.

Instead of using a controlled sonic or seismic source, differences in the normal hydrostatic pressure can be exploited to determine the relative depths of the hydrophones. As the hydrophones rotate, the height of the water column above them changes and with it the static pressure. In U.S. Pat. No. 4,547,869, such a method is used for fiber pressure sensors, which are commonly more sensitive to slow or quasi-static pressure changes than ceramic-based hydrophones.

Once the rotation angle, α, with respect to the vertical is known, its effect on the pressure gradient measurement can be corrected using:

$$dP/dz=(P_1-P_2)/(dz \cos \alpha) \quad [5]$$

This method is best applied to rotation angles close to the vertical axis, while for angles close to the horizontal axis, the vertical gradient is not measured as the difference $P_1-P_2$ becomes zero. This has been recognized as a weakness of the above embodiments and the following embodiments and examples of the invention demonstrate variants that avoid this weakness.

Figure 7A:
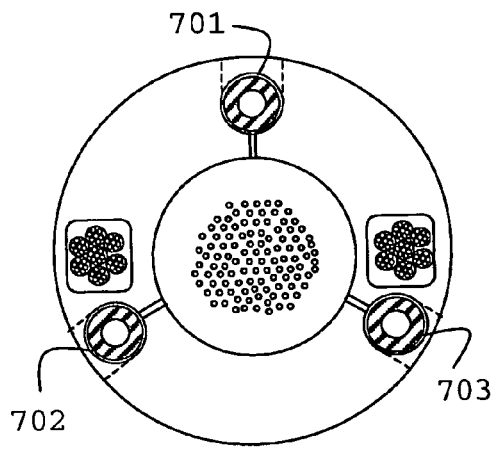
FIG. 7 shows another vertical cross-section of a streamer cable with three hydrophones without and with inclinometer.
Figure 7B:
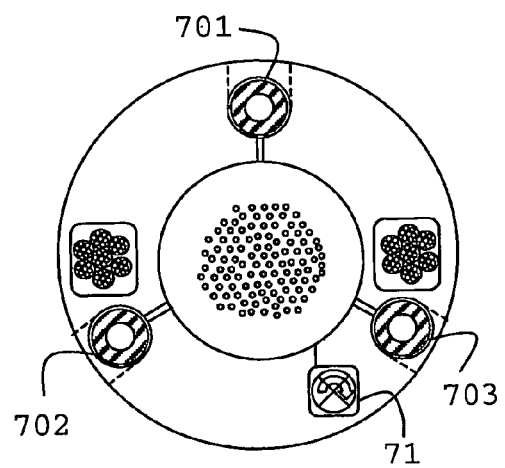

In a first of these preferred embodiments of the present invention, as illustrated in FIG. 7A, three hydrophones 701, 702, 703 are included in a group with each hydrophone being located at a corner of a triangle that in turn is oriented in the vertical crossline plane, i.e. perpendicular to the longitudinal axis of the cable. The same group of hydrophones 701, 702, 703 is shown in FIG. 7B with a solid state MEMS type inclinometer 71. The inclinometer determines the rotation of the surrounding section of the streamer cable and, hence, the orientation of the three hydrophones 701, 702, 703. Inclinometers 71 can be placed at the location of each hydrophone or more sparsely distributed along the streamer. In the latter case mechanical models of the streamer are used to interpolate the rotation of streamer sections between two inclinometers.

Figure 7C:
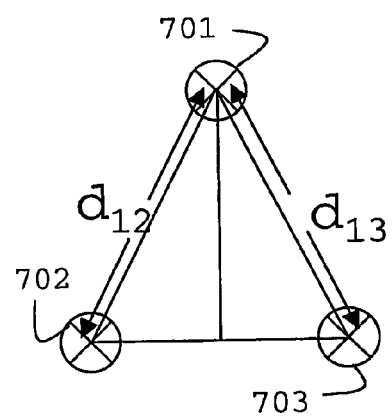

An equidistant triangle with d12=d13 is shown in FIG. 7C to illustrated the geometrical relationship and distances between the hydrophones. The embodiment of this FIG. 7 has the advantage that vertical pressure gradient can be obtained for any angle of streamer rotation including 90 degrees. An additional benefit is that seismic interference noise from other acoustic sources can be reduced, as is explained in greater details below.

Once the orientation is known, the vertical gradient can be calculated. The pressure measurement can be averaged over all three pressure measurements. For an equilateral triangular configuration as shown in FIG. 7 the vertical pressure gradient can be calculated as function of the streamer rotation angle α by:

$$dP/dz=(P_1-P_2)/(2d_{12}\cos(30+\alpha))+(P_1-P_3)/(2d_{13}\cos(30-\alpha)) \quad [6]$$

Where $d_{12}$ and $d_{13}$ are the distances between hydrophones 701 and 702, and between 701 and 703, respectively, as indicated in FIG. 7B.

Instead of recording the hydrophone signals directly the arrangement of FIG. 7 can be augmented by using a electric circuit as shown in FIG. 4. Outputs representing various linear combinations (additions/subtractions) of the hydrophone measurements can than be generated. For instance it is thus possible to output the average pressure $P_1+P_2+P_2$, and the differences $P_1-P_2$ and $P_1-P_3$. For a known streamer rotation angle the vertical pressure gradient can then be calculated using equation 6.

Figure 8:
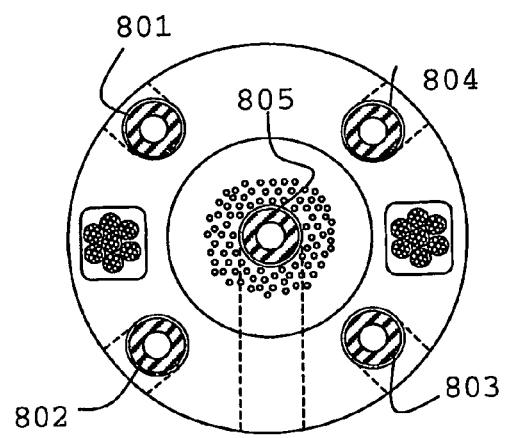
FIG. 8 shows a vertical cross-section of streamer cable with a five hydrophones arranged in plane.

Another alternative configuration is shown in FIG. 8 with two orthogonal pressure gradient sensors, each consisting of two hardwired hydrophones 801-804, in combination with a fifth single hydrophone 805. This configuration is an extension of the hydrophone group shown in FIG. 3. And similar to the example of FIG. 4, the central hydrophone 805 of the group of FIG. 8 can be omitted when the two pairs of hydrophones are both summed and subtracted using an electrical circuit before digitizing.

In addition to being capable of operating at all angles of rotation, it is a further advantage of the configuration is that the crossline pressure gradient dP/dy can be calculated and used to reduce seismic interference. The crossline pressure gradient will be dominated by seismic interference as source-related energy will propagate dominantly in the inline-vertical plane, assuming that the seismic lines are predominantly dip-lines. Some remaining source-related signal can be removed using a FK-filter applied to the crossline pressure gradient common shot gather. The contribution of the seismic interference noise to the pressure recording is given by:

$$P_{SI}=[dP/dy]\exp(-k_y)/[\exp(-ik_y y)-\exp(ik_y y)]P_{SI}=[dP/dy]/[1-2i\sin(ik_y y)] \quad [7]$$

Equation [7] requires a crossline wavenumber ky, which can be estimated when the relative angle of the seismic interference source with respect to the streamer orientation is known. The pressure wavefield due to seismic interference is then subtracted from the total pressure field:

$$P_{NOSI}=P-P_{SI} \quad [8]$$

Instead of this simple subtraction the seismic interference can also be removed with adaptive filtering as described for example in the international patent application WO-97/25632.

In the above-described example the hydrophones forming a group are arranged in a plane essentially perpendicular to the main axis of the streamer cable. However, for many seismic applications it is advantageous to record as many components of the pressure wavefield as possible within the constraints posed by the equipment. Such a complete or near-complete acquisition of the wavefield can be accomplished using at least on additional hydrophone that is located outside the plane defined by the other hydrophones. The additional hydrophone can either be part of the same group, i.e. located close to the other hydrophones of the group, or be member of a distant, preferably neighboring group of hydrophones.

Figure 9:
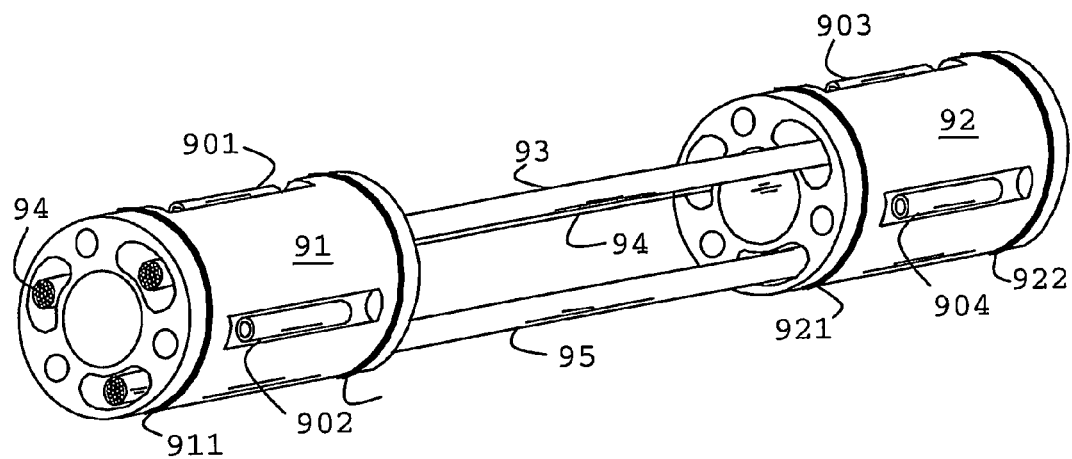
FIG. 9 shows a perspective view of a section of streamer cable with two neighboring groups of three hydrophones.

In the example of FIG. 9, there is shown a perspective view on a section of a streamer with two neighboring hydrophone holders 91, 92. The holders are made of a structural plastic material with holes to let wire cables 93, 94, 95 pass through the length of the streamer section. The two holders have bays to mount six hydrophones 901-904, only four of which are visible in the view. The holders further carry sealing rings 911, 912 and 921, 922 to slip an outer skin or sheath (not shown) over the streamer. The typical spacing between the two groups of hydrophones is 3.125 m.

The inline pressure gradient dP/dx can be calculated combining the output of one group of hydrophones, such as the three hydrophones in the holder 91, with the output of a hydrophone of the neighboring group in the holder 92. The inline seismic interference can then be calculated using the equivalent of equation [7] for the x direction, i.e. replacing y and ky by x and kx, and subtracted using same procedure as with the crossline seismic interference described above. The inline wavenumber kx can for example be estimated from the fk-spectrum of the seismic interference. Alternatively, the inline interference could be removed using known f-k filtering methods or other conventional filtering techniques.

Figure 10:
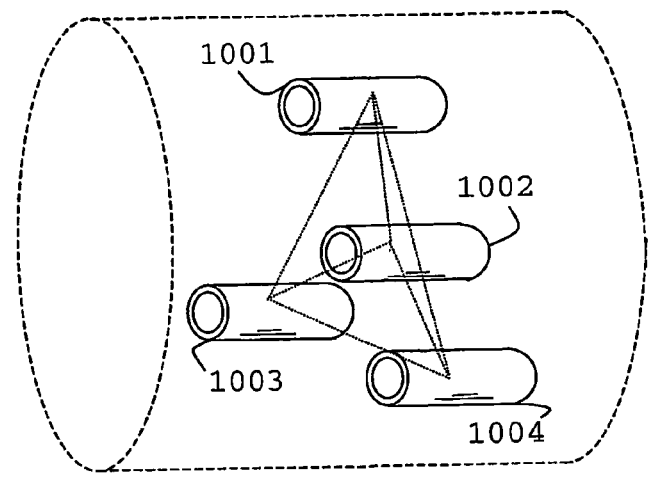
FIG. 10 shows a schematic perspective view of a section of streamer cable with a tetrahedrally arranged group of four hydrophones.

In FIG. 10, an alternative embodiment is shown wherein a group of three hydrophones 1001-1003 in a plane perpendicular to the streamer axis is combined with an additional out-of-plane hydrophone 1004. The four hydrophones 1001-1004 define a tetrahedral group of hydrophones which can be used to measure the complete acoustic wavefield, i.e. the pressure gradient in the vertical, inline and crossline directions or any other three (orthogonal) directions. The inline and crossline pressure gradients can then be used to remove seismic interference from all (near) horizontal directions following the procedure described above.

The various configurations described herein can be used in an Ocean Bottom Seismometer (OBS) or an Ocean Bottom Cable (OBC). The deghosting would be carried out in the common receiver domain, as OBSs are usually sparsely deployed.

The embodiments can be applied to retrievable systems as well to permanent systems. They will work in a marine environment as well as in transition zone.

The deghosting using pressure gradient measurements may be beneficial in underwater acoustic telemetry in order to deghost the received signal before further processing. It is further possible to improve the acoustic positioning systems as described above through the use of pressure gradient measurements by using the deghosting to remove sea surface reflection of sonic source signals.

The invention claimed is:

1. A marine seismic survey system comprising:
a marine cable, the marine cable comprising a plurality of piezo-ceramic pressure sensors and one or more electromechanical transducers, wherein said plurality of pressure sensors is arranged in groups of at least two pressure sensors and said group of a least two pressure sensors is configured to produce a group output being representative of a vertical pressure gradient at the group location, and wherein said one or more electromechanical transducers are configured to generate signals indicative of an angle of rotation of said at least two pressure sensors and means for correcting the vertical pressure gradient for the effect of rotation angle.

2. The seismic survey system of claim 1 wherein the group comprises at least three hydrophones.

3. The seismic survey system of claim 1 wherein the at least two pressure sensors of a group are located in a plane perpendicular to the main or longitudinal axis of the cable.

4. The seismic survey system of claim 1 wherein the at least pressure sensors of a group are located in a plane perpendicular to the main or longitudinal axis of the cable and wherein an output of said group is combined with an output of a further hydrophone located outside said plane.

5. The seismic survey system of claim 1 wherein the group comprises four hydrophones in a tetrahedral configuration.

6. The seismic survey system of claim 1 wherein the at least two pressure sensors contributing to the group output being representative of the vertical pressure gradient are located within a section the cable of less than 10 cm length as measured in the main or longitudinal direction of said cable.

7. The seismic survey system of claim 1 wherein each pressure sensor of a group is arranged at essentially equal distance from the other sensors of the group.

8. The seismic survey system of claim 1 wherein the pressure sensors of a group are connected to provide an output representative of a linear combination of individual sensor signals prior to digitization.

9. The seismic survey system of claim 1 wherein the one or more electromechanical transducers are a plurality of inclinometers distributed along the length of the cable.

10. The seismic survey system of claim 1 wherein the one or more electromechanical transducers are one or more acoustic or sonic sources.

11. The seismic survey system of claim 10 wherein the one or more electromechanical transducers comprise one or more acoustic sources located within cables towed in parallel with the cable carrying the groups of at least two hydrophones.

12. The seismic survey system of claim 1 wherein the one or more electromechanical transducers are adapted to operate independently of the hydrostatic pressure.

13. A marine seismic cable with a plurality of piezo-ceramic pressure sensors, wherein said plurality of pressure sensors is arranged in groups of at least two pressure sensors with a group output being representative of the vertical pressure gradient at the group location, for use in system according to claim 1.

14. A method of acquiring an acoustic wavefield having in-line, cross-line and vertical components using a marine seismic survey system comprising:

using a plurality of piezo-ceramic pressure sensors disposed in a marine cable to measure the vertical component of the acoustic wavefield;

generating an output being representative of the vertical pressure gradient;

one or more electromechanical transducers to generate signals indicative of a rotation angles of said plurality of pressure sensors; and using said signals indicative of said rotation angle of said plurality of pressure sensors to correct said vertical pressure gradient for the effect of the rotation angle.

* * * * *